(12) United States Patent
Cheng

(10) Patent No.: US 6,962,452 B2
(45) Date of Patent: Nov. 8, 2005

(54) KEYBOARD HAVING KEY FLOATING DEVICE

(76) Inventor: Wen Lung Cheng, P.O. Box 10-69, Chong Ho, Taipei (TW) 235

( * ) Notice: Subject to any disclaimer, the term of this patent is extended or adjusted under 35 U.S.C. 154(b) by 0 days.

(21) Appl. No.: 10/824,817

(22) Filed: Apr. 13, 2004

(65) Prior Publication Data

US 2005/0226669 A1    Oct. 13, 2005

(51) Int. Cl.[7] .............................................. B41J 5/08
(52) U.S. Cl. .................. 400/490; 400/479; 400/479.2; 400/481
(58) Field of Search .............................. 400/490, 491, 400/491.1, 480, 481, 479.2, 479.474

(56) References Cited

U.S. PATENT DOCUMENTS

| | | | |
|---|---|---|---|
| 3,831,730 A | * | 8/1974 | Koeppe ..................... 400/481 |
| 5,120,923 A | * | 6/1992 | Kato et al. .................. 200/520 |
| 5,199,556 A | * | 4/1993 | Lee ............................. 200/345 |
| 5,220,318 A | * | 6/1993 | Staley ......................... 341/34 |
| 5,911,529 A | * | 6/1999 | Crisan ........................ 400/472 |
| 6,842,332 B1 | * | 1/2005 | Rubenson et al. .......... 361/680 |
| 2003/0072595 A1 | * | 4/2003 | Al-Safar ..................... 400/490 |

* cited by examiner

*Primary Examiner*—Andrew H. Hirshfeld
*Assistant Examiner*—Marissa Ferguson

(57) ABSTRACT

A keyboard includes a housing having a number of passages formed by cylindrical members, a number of keys each having a shank slidably engaged in the passages of the housing, and an electromagnetic floating force generating device having a number of coils arranged to generate electromagnetic floating force and to float the keys relative to the housing. A number of magnets may be attached onto the keys and acted with the coils, to allow the keys to be floated by the electromagnetic floating force generated by the coils or the magnets. One or more fan devices may be disposed in the housing to circulate air through the keys.

4 Claims, 8 Drawing Sheets

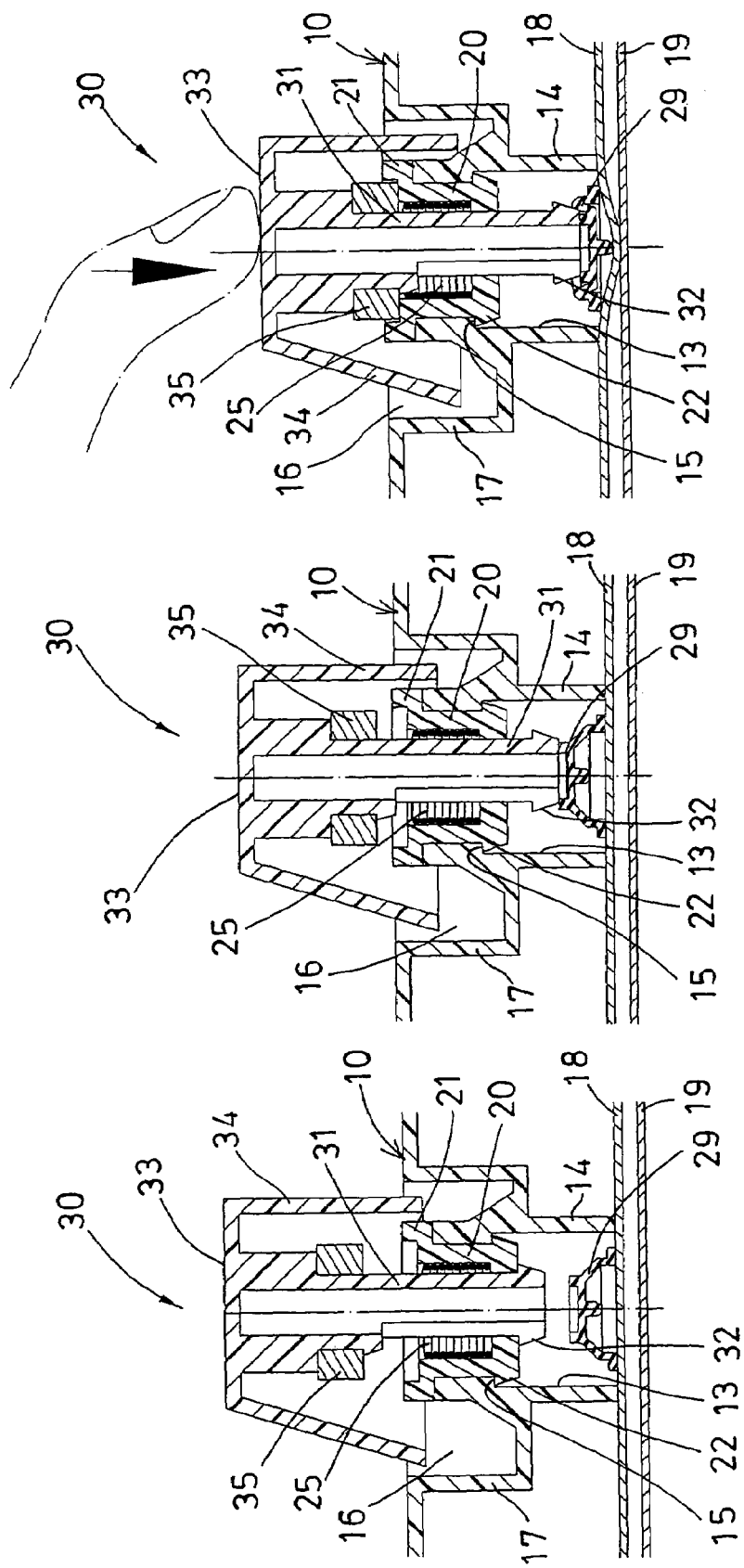

KEYBOARD HAVING KEY FLOATING DEVICE

BACKGROUND OF THE INVENTION

1. Field of the Invention

The present invention relates to a keyboard, and more particularly to a keyboard having a key floating device, to float the keys, and to allow the keys to be comfortably stricken or operated by users.

2. Description of the Prior Art

Various kinds of typical keyboards have been developed and comprise a number of keys resiliently supported in a housing, for being stricken or hit by users, to enter information or data to computer facilities.

Normally, the typical keyboards comprise a number of spring members engaged in the keys, and disposed or biased between the keys and the housing, to resiliently support or bias the keys within the housing. The users' fingers have to strike or hit the keys downwardly against the spring members, to overcome the spring biasing forces of the spring members, and thus to allow the keys to force conductor points of films together.

However, after striking the keys for a long working time, the users' finger may feel pain, because the spring members may not suitably cushion the keys, and the fingers of the users may also have to spend a lot of force against the spring members and the keys while striking or hitting the keys.

In addition, after striking the keys for a long working time, some of the users may sweat and may wet the keys with the users' fingers. However, the typical keyboards have no blowing devices to blow or to dry the hands of the users.

The present invention has arisen to mitigate and/or obviate the afore-described disadvantages of the conventional keyboards.

SUMMARY OF THE INVENTION

The primary objective of the present invention is to provide a keyboard including a key floating device, to float the keys, and to allow the keys to be comfortably stricken by users.

The other objective of the present invention is to provide a keyboard including a blowing device, to circulate air through the keys or the keyboard, for blowing and drying the fingers of the users.

The further objective of the present invention is to provide a keyboard including a light device to selectively light the keyboard.

In accordance with one aspect of the invention, there is provided a keyboard comprising a housing including a number of passages formed therein and each defined by a cylindrical member, a number of keys each including a shank slidably engaged in the passages of the housing respectively, and an electromagnetic floating force generating device for generating electromagnetic floating force to float the keys relative to the housing. The keys may be floated by the electromagnetic floating force, and may thus be comfortably depressed or hit or stricken by the users, such that the keyboard may be comfortably operated by the users.

The electromagnetic floating force generating means includes a number of coils arranged to generate the electromagnetic floating force, and includes a number of magnets attached onto the keys respectively, and arranged to be acted with the coils respectively. The housing includes a switch to control the coils to generate the electromagnetic floating force.

The magnets may be attached to the shanks of the keys respectively. The housing includes a number of sleeves engaged in the passages thereof respectively, to retain the coils in the sleeves respectively. Each of the sleeves includes a peripheral rib extended laterally and inwardly therefrom, to engage with and to retain the coil in the sleeves respectively.

Each of the sleeves includes a peripheral flange extended laterally and outwardly therefrom, to engage with the cylindrical member, and to anchor the sleeves to the cylindrical members of the housing respectively.

Each of the cylindrical members of the housing includes an annular shoulder formed therein, and each of the sleeves includes at least one latch extended laterally out therefrom, to engage with the annular shoulders of the cylindrical members, and to anchor the sleeves to the cylindrical members respectively.

The housing includes a number of recesses formed therein and each defined by a peripheral wall, and each of the keys includes a knob having a peripheral skirt slidably engaged in the recesses of the housing respectively. The housing includes a number of pads disposed in the cylindrical members, and aligned with the shanks of the keys respectively.

The housing includes an outer peripheral portion having a number of light devices disposed therein. The housing includes a switch to control the light devices to generate lights and to light the housing. It is preferable that the housing is made of transparent, or semi-transparent materials, to allow the light generated by the light devices to be seen through the housing.

The housing includes at least one fan device disposed therein to circulate air through the keys, and to dry the sweat or the hands of the users. The housing includes a switch to control the fan device.

Further objectives and advantages of the present invention will become apparent from a careful reading of the detailed description provided hereinbelow, with appropriate reference to the accompanying drawings.

BRIEF DESCRIPTION OF THE DRAWINGS

FIGS. 5, 6, 7 are partial cross sectional views illustrating the operation of the keyboard;

DETAILED DESCRIPTION OF THE PREFERRED EMBODIMENT

Figure 1:
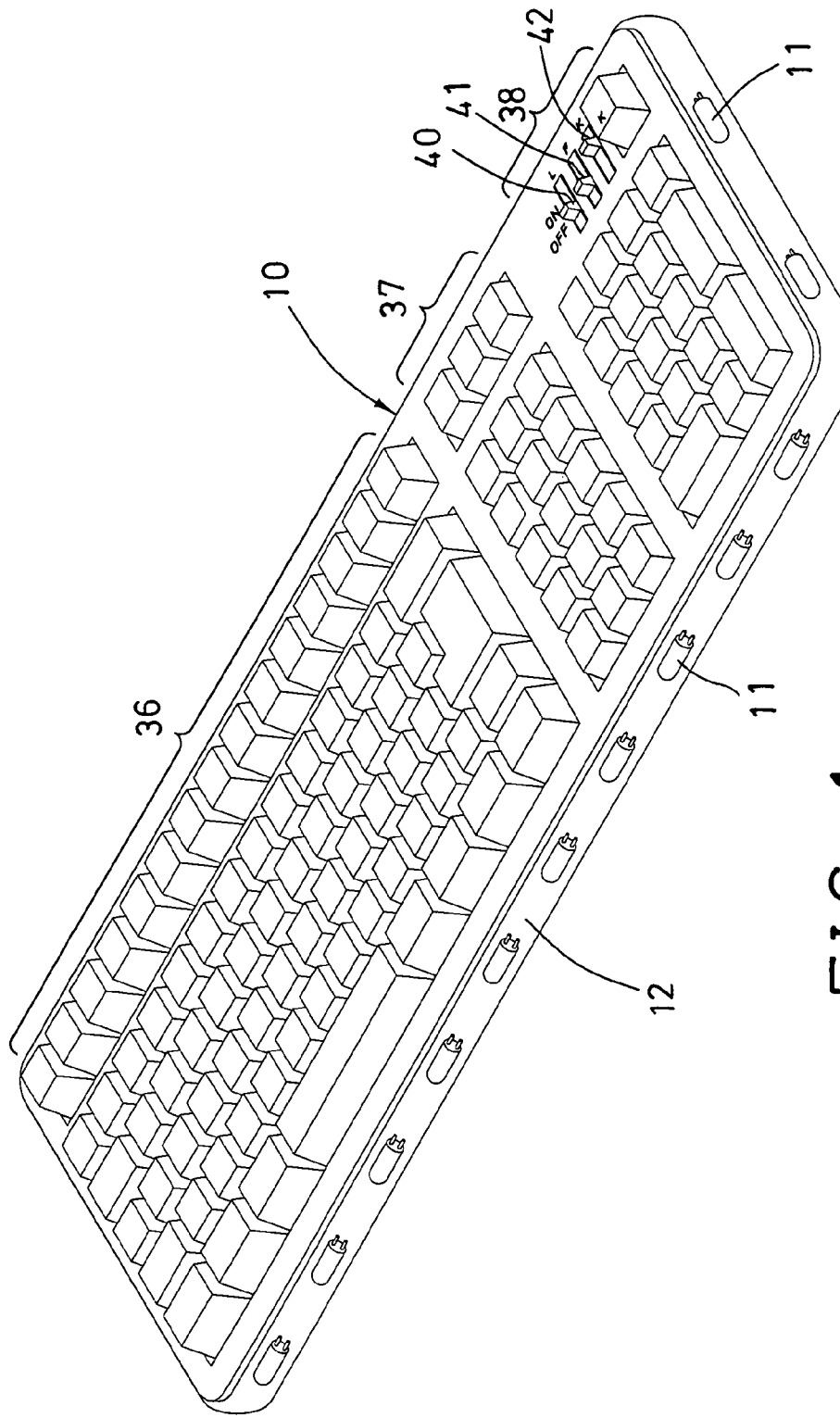
FIG. 1 is a perspective view of a keyboard in accordance with the present invention.
Figure 2:
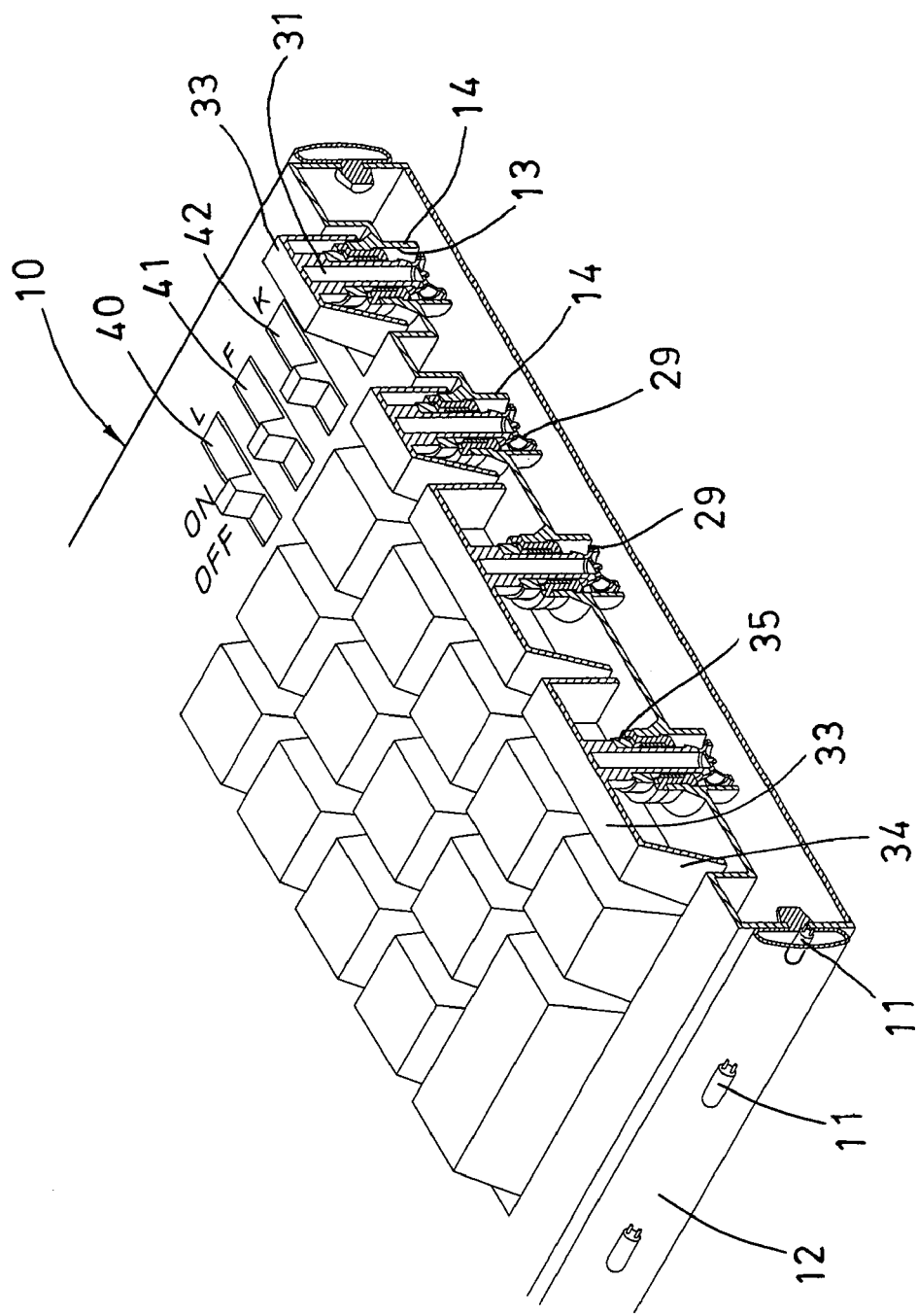
FIG. 2 is an enlarged partial perspective view of the keyboard, in which a portion of the keyboard is cut off to show an inner structure of the keyboard.
Figure 3:
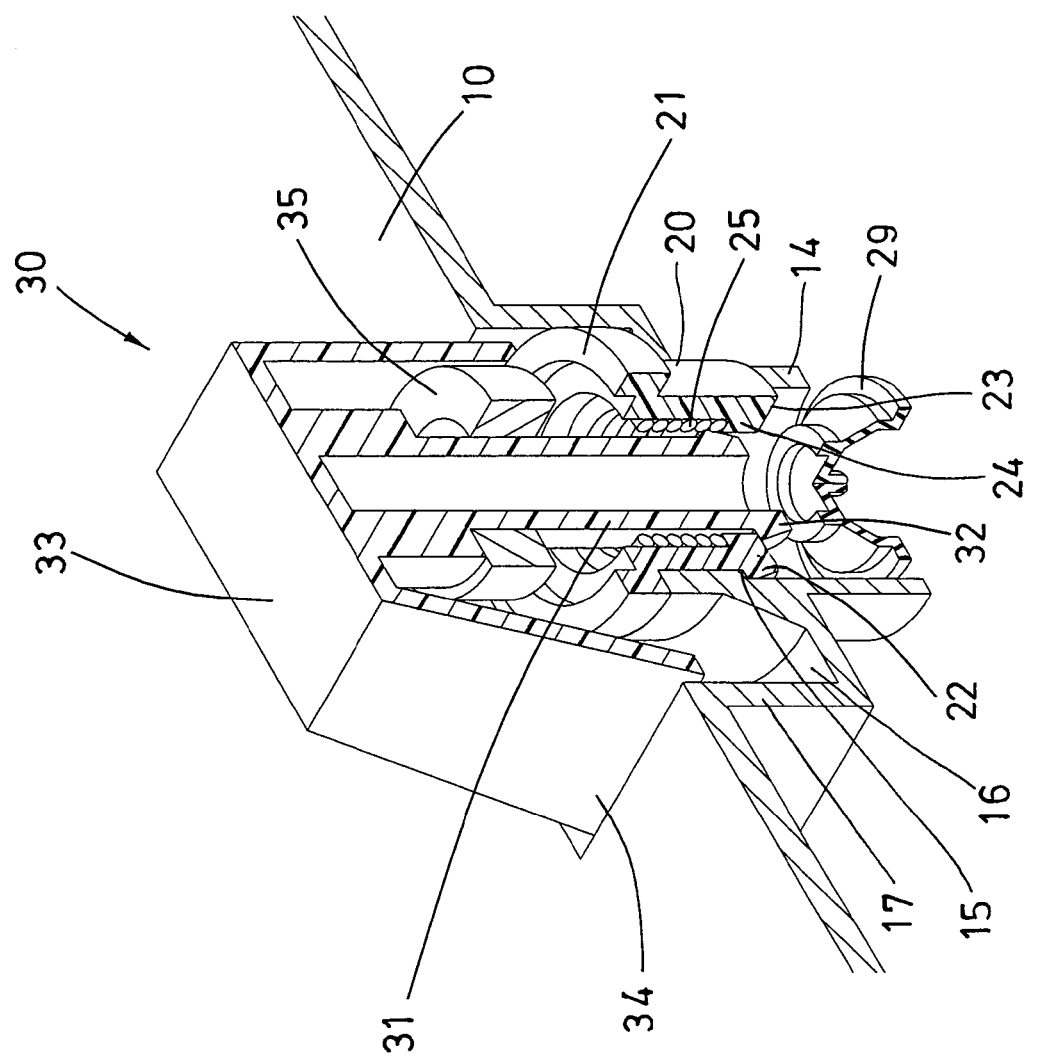
FIG. 3 is a further enlarged partial perspective view of the keyboard, in which a portion of the keyboard is cut off to show an inner structure of the keyboard.
Figure 4:
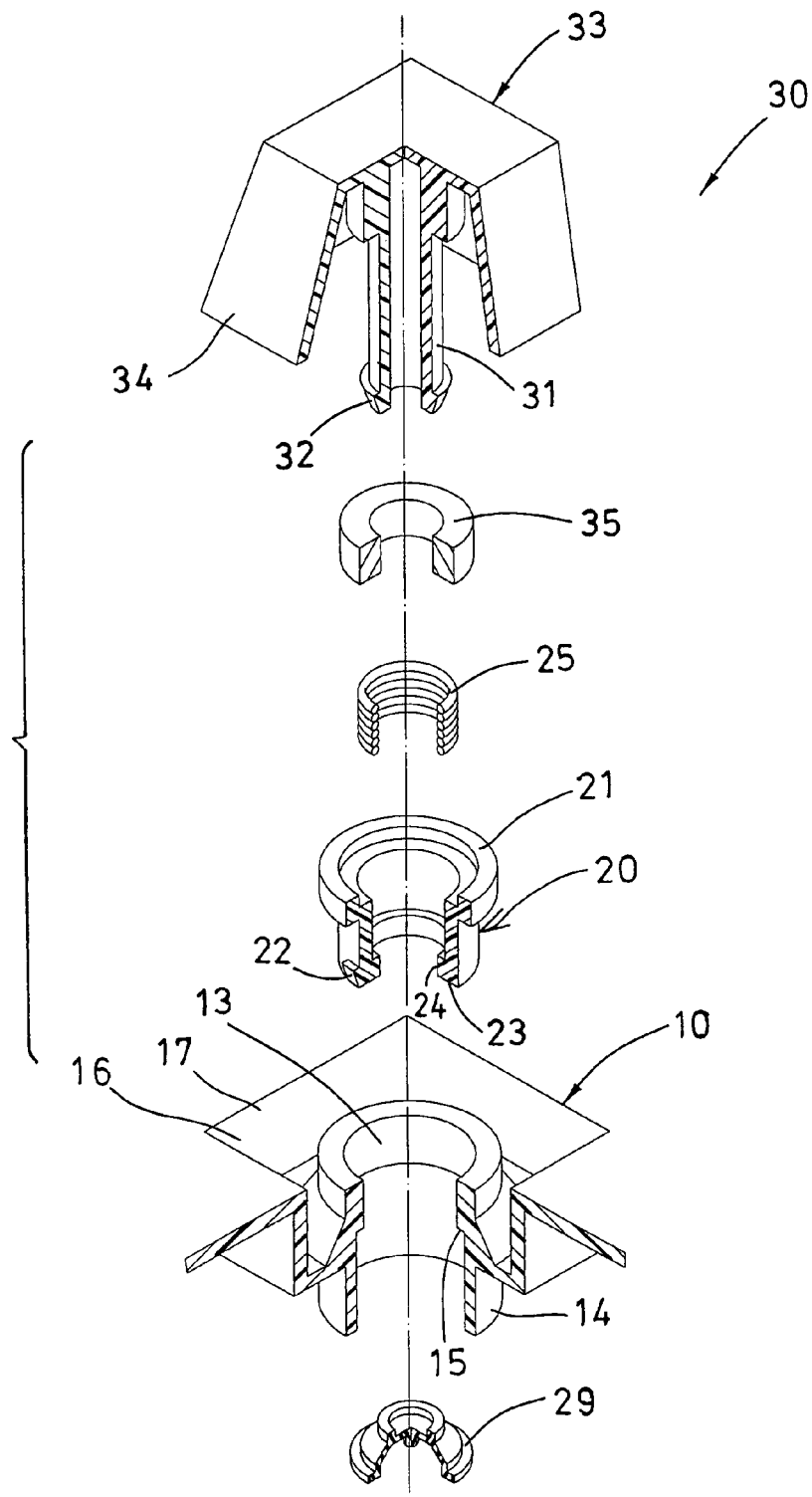
FIG. 4 is an exploded view of a key device of the keyboard.
Figure 8:
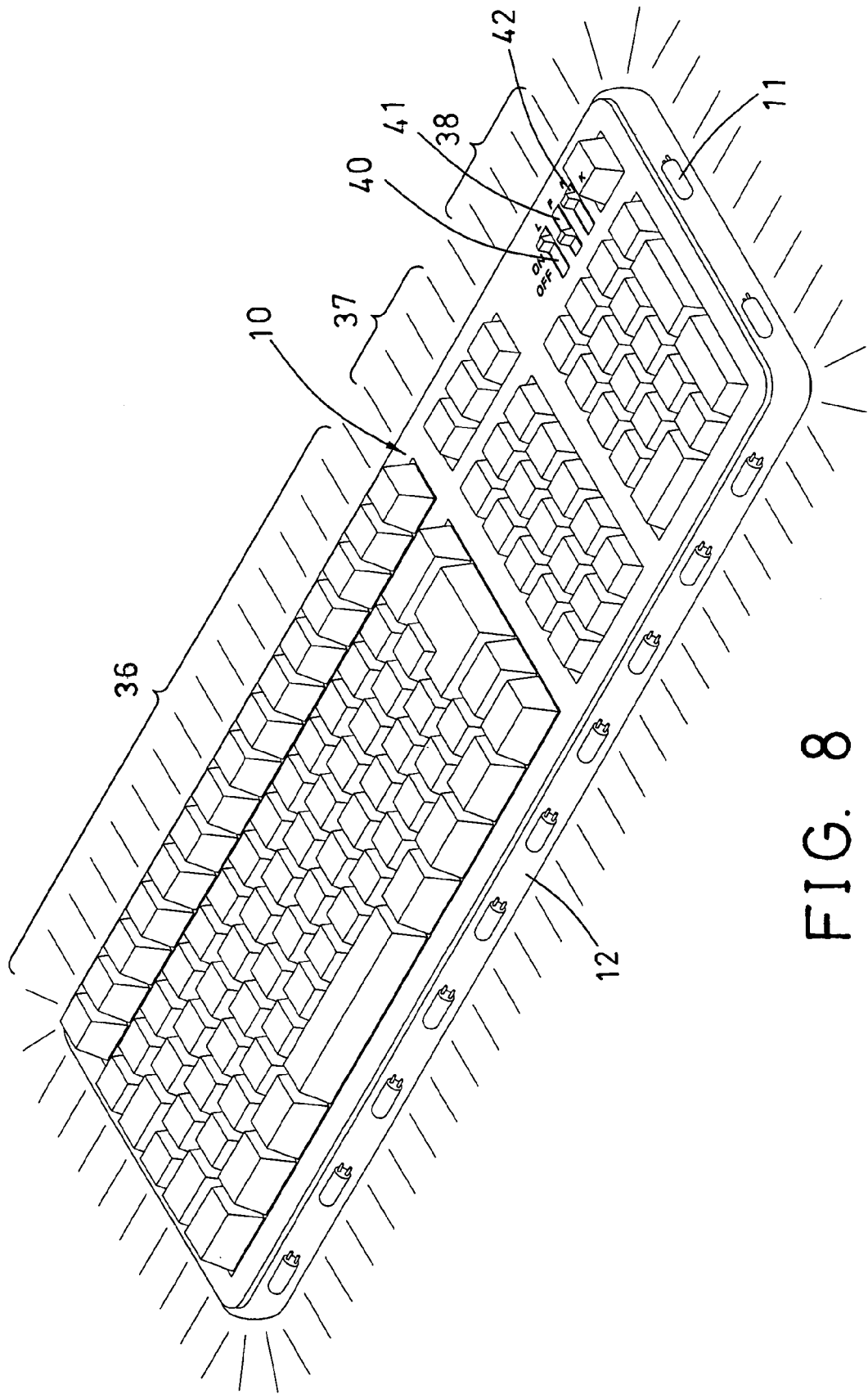
FIG. 8 is a perspective view illustrating the operation of the keyboard.

Referring to the drawings, and initially to FIGS. 1–3, a keyboard in accordance with the present invention comprises a housing 10 including a number of light devices 11, such as light emitting diodes, liquid crystal displays, or the like, disposed and/or arranged in an outer peripheral portion 12 thereof, best shown in FIG. 2. It is preferable that the housing 10 is made of transparent, or semi-transparent materials, to allow the light generated by the light devices 11 to be seen through the housing 10 (FIG. 8).

As shown in FIGS. 3–7, the housing 10 includes a number of passages 13 formed therein and each defined by a cylindrical member 14 which includes an inner or annular shoulder 15 formed therein. It is preferable that the housing 10 further includes a number of recesses 16 formed therein, such as formed around the passages 13 thereof and the cylindrical members 14 respectively, and each defined by a peripheral wall 17.

As shown in FIGS. 5–7, the housing 10 further includes two conventional films 18, 19 disposed in the bottom thereof, and spaced away from each other, and each having a number of switch or conductor points (not shown) provided therein and arranged or aligned with the passages 13 and the cylindrical members 14 of the housing 10 respectively. The conductor points of the conventional films 18, 19 are arranged to be forced to be contacted with each other, for entering information or data to computer facilities.

A number of sleeves 20 may further be provided and engaged into the upper portions of the passages 13 and the cylindrical members 14 of the housing 10 respectively, and each includes a peripheral flange 21 extended laterally out from the upper portion thereof and engaged with the cylindrical members 14 of the housing 10 respectively, to anchor or to position the sleeves 20 to the cylindrical members 14 of the housing 10 respectively, and to prevent the sleeves 20 from being engaged into the cylindrical members 14 of the housing 10 respectively.

Each of the sleeves 20 further includes one or more latches 22 extended laterally out from the lower portion 23 thereof and engaged with the annular shoulder 15 of the cylindrical member 14 of the housing 10 respectively, to anchor or to secure the sleeves 20 to the cylindrical members 14 of the housing 10 respectively. It is preferable that each of sleeves 20 further includes an inner peripheral rib 24 extended laterally and inwardly from the lower portion 23 thereof, for engaging with and for retaining a coil 25 within each of the sleeves 20.

A number of keys 30 are further provided and engaged into the passages 13 and the cylindrical members 14 of the housing 10 respectively, and/or engaged into the sleeves 20 respectively. For example, each of the keys 30 includes a shank 31 slidably engaged into or through the passages 13 and the cylindrical members 14 of the housing 10 and/or engaged into or through the sleeves 20 respectively.

Each of the shanks 31 of the keys 30 includes a catch 32 extended laterally out from the lower portion thereof, to engage with the sleeves 20 or the cylindrical members 14 of the housing 10 respectively, and to anchor the shanks 31 of the keys 30 to the sleeves 20 or to the cylindrical members 14 of the housing 10 respectively, and to prevent the shanks 31 of the keys 30 from being disengaged from the sleeves 20 or from the cylindrical members 14 of the housing 10 respectively.

Each of the shanks 31 of the keys 30 includes a knob 33 provided on top thereof, for being depressed or hit or stricken by the users. It is preferable that each of the knobs 33 includes a peripheral skirt 34 dependent downwardly therefrom, and slidably engaged in the respective recesses 16 of the housing 10, to smoothly guide the keys 30 to move up and down relative to the housing 10.

It is further preferable that each of the peripheral skirts 34 of the knobs 33 and the recesses 16 or the peripheral walls 17 of the housing 10 includes a non-circular cross section, to prevent the peripheral skirts 34 of the knobs 33 from being rotated relative to the recesses 16 or the peripheral walls 17 of the housing 10, and thus to further stably and smoothly guide the keys 30 to move up and down relative to the housing 10.

A number of magnets 35 are further provided and engaged or secured onto the shank 31 of the keys 30 respectively, for being acted with the coils 25, in order to float the keys 30 (FIG. 6) when the coils 25 are energized. The coils 25 may be coupled to the typical electric source (not shown) of the keyboard, for being selectively energized by the typical electric source of the keyboard.

It is preferable that a number of spring or resilient pads 29 are further provided and disposed in bottom portion of the cylindrical members 14 of the housing 10 respectively, and disposed below and aligned with the shank 31 of the keys 30 respectively, and arranged or aligned with the switch or conductor points of the conventional films 18, 19 respectively, for allowing the pads 29 to be depressed or hit by the shank 31 of the keys 30 before the conductor points of the conventional films 18, 19 are forced to be contacted with each other. The pads 29 may thus be used to cushion or to protect the films 18, 19, and to prevent the films 18, 19 from being damaged by the shank 31 of the keys 30.

In operation, as shown in FIG. 5, when the keyboard has not been coupled to the electric source, the coils 25 will not be energized, such that the keys 30 may be moved downwardly by gravity and/or may be engaged with the pads 29 respectively.

As shown in FIG. 6, when the keyboard is coupled to the electric source, the coils 25 will be energized to generate a magnetic field and to force the magnet 35 away from the coil 25, and thus to float the key 30, such that the keys 30 may be moved upwardly against the gravity and may be moved away from the pads 29 respectively.

As shown in FIG. 7, when the keys 30 may be depressed or hit or stricken downwardly by the users against the floating force or electromagnetic force generated by the magnet 35 and the coil 25, the shank 31 of the keys 30 may be forced downwardly to depress the pads 29 and the films 18, 19, and to force the conductor points of the films 18, 19 to be contacted with each other, and thus to enter information or data to the computer facilities.

It is to be noted that the keys 30 may be floated by the floating force or electromagnetic force generated by the magnet 35 and the coil 25, and may thus be comfortably depressed or hit or stricken by the users, such that the keyboard may be comfortably operated by the users.

As shown in FIGS. 1–2, 8 and 10, the housing 10 may further include one or more switches 40, 41, 42 disposed thereon. For example, the switch 40 may be used to control the light devices 11, and the other switch 42 may be used to control the coils 25, to selectively energize or operate the coils 25 to float the keys 30.

The keyboard may include one or more groups 36, 37, 38 of keys 30 that may be selectively or changeably energized or operated by the switch 42, according to the users' need. For example, when the switch 42 is depressed or actuated once, the coils 25 of the first group 36 of the keys 30 may be selectively energized or operated to float the first group 36 of the keys 30.

Alternatively, when the switch 42 is depressed or actuated twice or three times, the coils 25 of the second or the third groups 37, 38 of the keys 30 may be selectively energized or operated to float the second or the third group 37, 38 of the keys 30. Further alternatively, all of the coils 25 of all of the groups 36–38 of the keys 30 may be selectively energized or operated to float all of the keys 30 when the switch 42 is depressed or actuated four times, for example.

Figure 9:
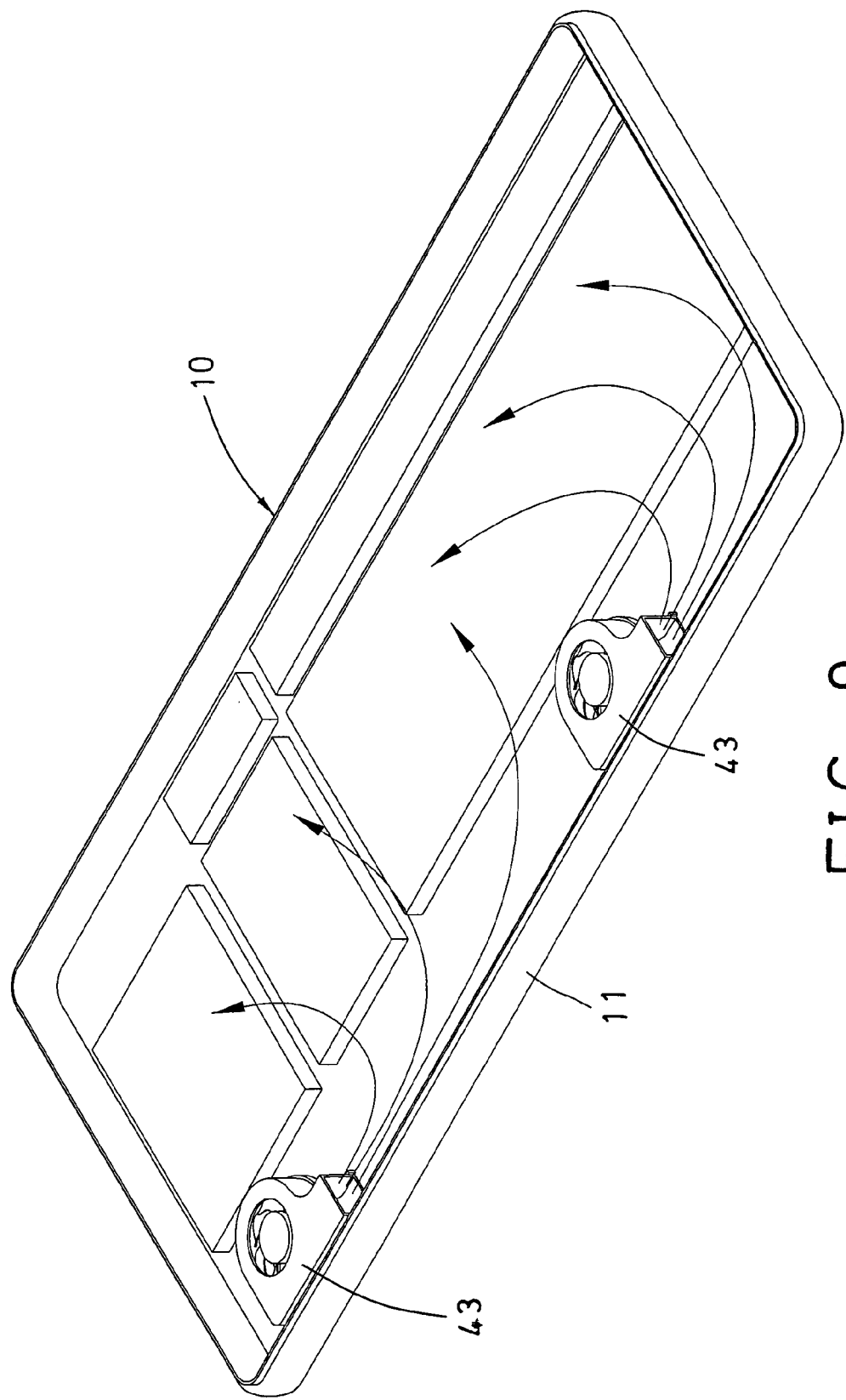
FIG. 9 is a bottom perspective view of the keyboard.
Figure 10:
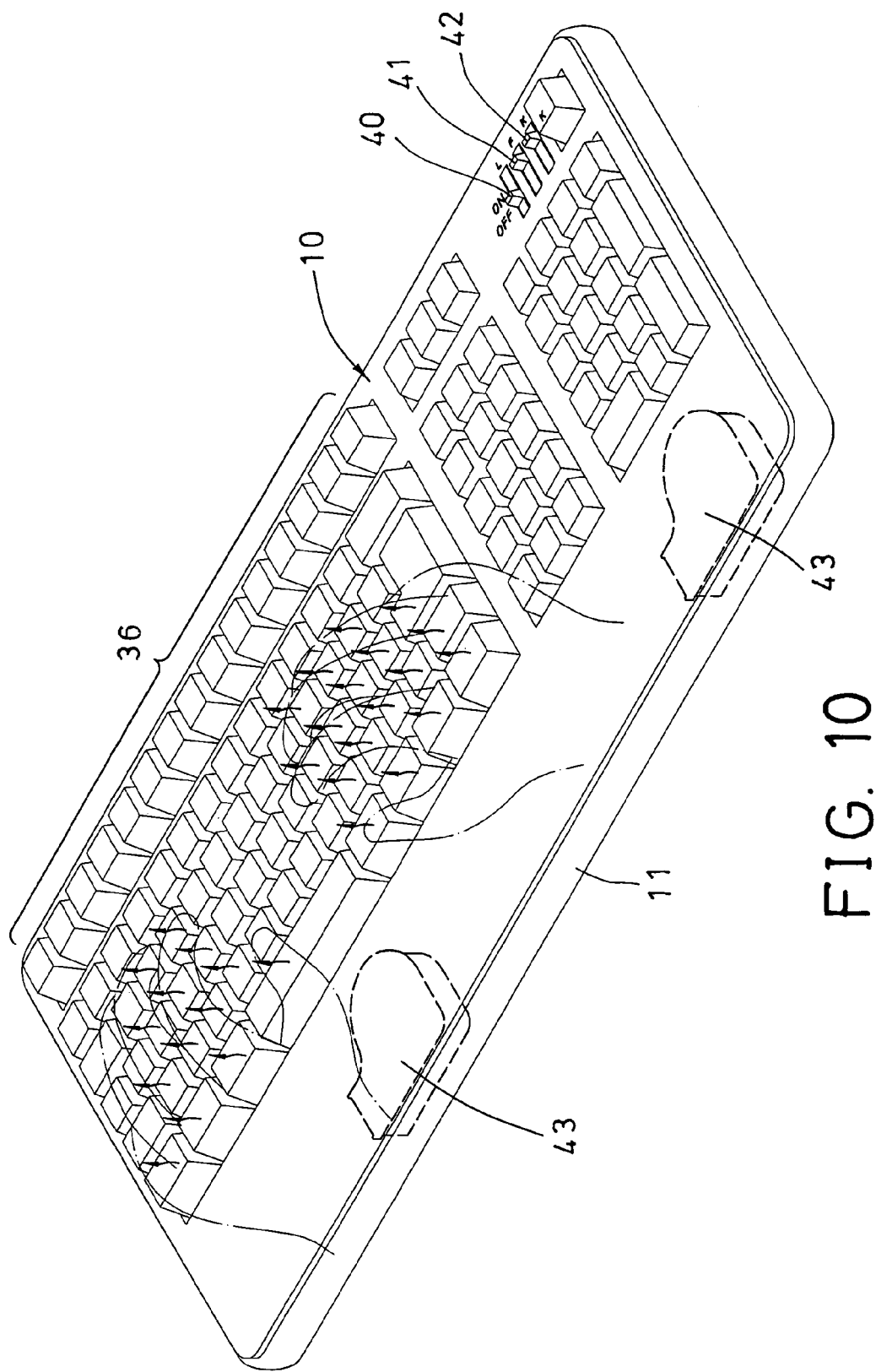
FIG. 10 is a perspective view illustrating the operation of the blowing device of the keyboard.

Referring next to FIGS. 9 and 10, one or more blowing or fan devices 43 may further be provided and disposed within the housing 10, and may be controlled by the other switch 41, and may be selectively energized or operated to generate air and to circulate the air through the keys 30, to dry the sweat of the users.

None of the typical keyboards has suggested to provide a fan or a blowing device to blow air and to circulate the air through the keys 30, in order to dry the sweat of the users.

Accordingly, the keyboard in accordance with the present invention includes a key floating device, to float the keys, and to allow the keys to be comfortably stricken by users, and/or includes a blowing device, to circulate air through the keys or the keyboard, for blowing and drying the fingers of the users, and/or includes a light device to selectively light the keyboard.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A keyboard comprising:
   a housing including a plurality of passages formed therein and each defined by a cylindrical member;
   a plurality of keys each including a shank slidably engaged in said passages of said housing respectively; and
   means for generating electromagnetic floating force to float said keys relative to said housing;
   wherein said electromagnetic floating force generating means includes a plurality of coils arranged to generate the electromagnetic floating force;
   wherein said housing including a plurality of sleeves engaged in said passages thereof respectively, to retain said coils in said sleeves respectively.

2. The keyboard as claimed in claim 1, wherein each of said sleeves includes a peripheral rib extended laterally and inwardly therefrom to engage with and to retain said coil in said sleeve respectively.

3. The keyboard as claimed in claim 1, wherein each of said sleeves includes a peripheral flange extended laterally and outwardly therefrom, to engage with said cylindrical member, and to anchor said sleeves to said cylindrical members of said housing respectively.

4. The keyboard as claimed in claim 1, wherein each of said cylindrical members of said housing includes an annular shoulder formed therein, and each of said sleeves includes at least one latch extended laterally out therefrom, to engage with said annular shoulders of said cylindrical members, and to anchor said sleeves to said cylindrical members respectively.

* * * * *